United States Patent [19]
Habermeier et al.

[11] 3,894,038
[45] July 8, 1975

[54] HYDROXYALKYL DERIVATIVES OF ALKYLENE-BIS-HYDANTOINS

[75] Inventors: Juergen Habermeier, Allschwil; Hans Batzer, Arlesheim; Daniel Porret, Binningen, all of Switzerland

[73] Assignee: Ciba-Geigy AG, Basel, Switzerland

[22] Filed: Jan. 4, 1973

[21] Appl. No.: 321,102

Related U.S. Application Data

[62] Division of Ser. No. 118,499, Feb. 24, 1971, Pat. No. 3,821,242.

[52] U.S. Cl. ............................................. 260/309.5
[51] Int. Cl. ............................................ C07d 49/32
[58] Field of Search ................................. 260/309.5

[56] References Cited
UNITED STATES PATENTS
2,876,062  3/1959  Torke et al. ..................... 260/309.5

FOREIGN PATENTS OR APPLICATIONS
1,546,270  10/1968  France ........................... 260/309.5
1,576,669  8/1969  France ........................... 260/309.5

OTHER PUBLICATIONS
Sato, Chem. Abst., Vol. 59, Col. 3908, (19), QD1.A51.

*Primary Examiner*—Natalie Trousof
*Attorney, Agent, or Firm*—Vincent J. Cavalier

[57] ABSTRACT

New diglycidyl ethers of binuclear, five-membered or six-membered, unsubstituted or substituted, N-heterocyclic compounds containing two NH groups in the molecule and containing added-on butene oxide, produced by reaction of binuclear, five-membered or six-membered, unsubstituted or substituted, N-heterocyclic compounds, such as bis-(hydantoin) or bis-(dihydrouracil) compounds, for example 1,1'-methylene-bis-(5,5-dimethylhydantoin), 1,6-bis-(5,5-dimethylhydantoinyl-3)-hexane or $\beta,\beta'$bis-(5,5-dimethylhydantoinyl-3)-diethyl ether, with butene oxide, for example 1,2-butene oxide, to give monoalcohols or dialcohols, and subsequent glydidylation of the OH groups or of the OH group and the NH group to give the corresponding glycidyl ethers.

5 Claims, No Drawings

HYDROXYALKYL DERIVATIVES OF ALKYLENE-BIS-HYDANTOINS

This is a divisional of application Ser. No. 118,499, filed on Feb. 24, 1971 now U.S. Pat. No. 3,821,242.

The subject of the U.S. Pat. No. 3,679,681 application Ser. No. 1289, Jan. 7, 1970 are new diglycidyl compounds of the general formula

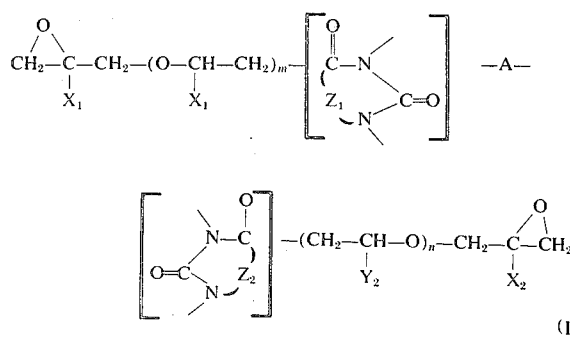

(I)

wherein $Z_1$ and $Z_2$ independent of one another each denote a nitrogen-free divalent radical which is necessary to complete a five-membered or six-membered, unsubstituted or substituted, heterocyclic ring, A represents a divalent aliphatic, cycloaliphatic or araliphatic radical, and in particular preferably represents an alkylene radical, or an alkylene radical interrupted by oxygen atoms, $X_1$, $X_2$, $Y_1$ and $Y_2$ each denote a hydrogen atom or a methyl group, and $m$ and $n$ each represent an integer having a value of 0 to 30, preferably of 0 to 4, the sum of $m$ and $n$ having to be at least 1.

The compounds of the formula (I) are manufactured by reacting compounds of the general formula

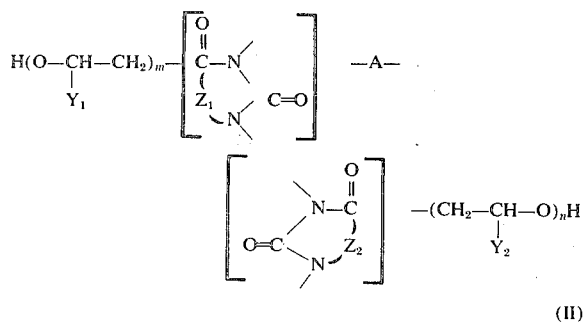

(II)

wherein $Z_1$, $Z_2$, A, $Y_1$, $Y_2$, $m$ and $n$ have the same meaning as in the formula (I), in a single stage or in several stages, with an epihalogenohydrin or β-methylepihalogenohydrin, such as, for example, epichlorohydrin, β-methylepichlorohydrin or epibromohydrin, in a manner which is in itself known.

The monoalcohols or dialcohols of the general formula (II) have hitherto not yet been described in the literature, and are obtained in a known manner by reacting binuclear N-heterocyclic compounds of the general formula

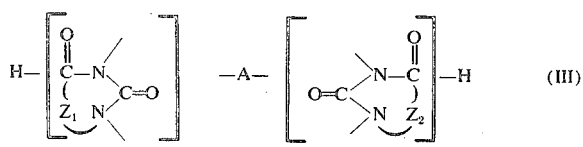

(III)

wherein $Z_1$, $Z_2$ and A have the same meaning as in the formula (I), with alkene oxides, preferably ethene oxide (ethylene oxide) or propene oxide (propylene oxide), in the presence of a suitable catalyst.

It has now been found that reaction of binuclear N-heterocyclic compounds of the formula (III) with a butene oxide, preferably 1,2-butene oxide, 1,2-cyclopentene oxide or 1,2-cyclohexene oxide in the presence of a suitable catalyst yields new monoalcohols or dialcohols, which can be reacted, in a known manner, in one stage or several stages, with an epihalogenohydrin or β-methylepihalogenohydrin, such as, for example, epichlorohydrin, β-methylepichlorohydrin or epibromohydrin, to give glycidyl compounds.

In comparison to the glycidyl compounds described in the main patent, the new glycidyl compounds are distinguished by considerably lower viscosity, so that apart from being used in the customary casting resin applications they can also be used as, for example, laminating resins.

The subject of the present invention are new diglycidyl ethers of the general formula

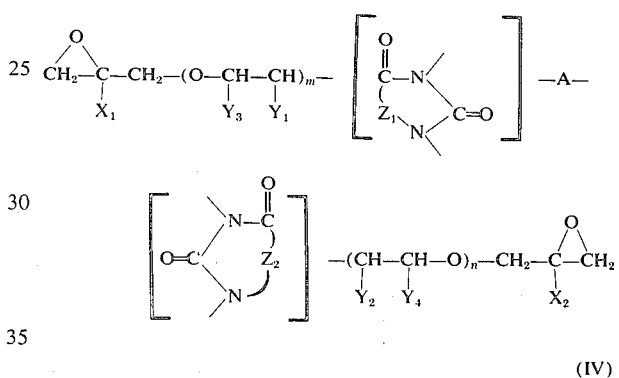

(IV)

wherein $X_1$, $X_2$, $Y_1$ and $Y_2$ each denote a hydrogen atom or a methyl group and $Y_3$ and $Y_4$ each denote a methyl or ethyl group, with the sum of the carbon atoms in the two radicals $Y_1$ and $Y_3$ or $Y_2$ and $Y_4$ always having to be 2, or wherein $Y_1$ and $Y_3$, or $Y_2$ and $Y_4$, together denote the trimethylene or tetramethylene radical and wherein $Z_1$ and $Z_2$ independently of one another each denote a nitrogen-free, divalent radical which is necessary to complete a five-membered or six-membered, unsubstituted or substituted, heterocyclic ring, A represents a divalent aliphatic, cycloaliphatic or araliphatic radical, and in particular preferably represents an alkylene radical or an alkylene radical interrupted by oxygen atoms, and m and n each represent an integer having a value of 0 to 30, preferably of 0 to 4, the sum of $m$ and $n$ having to be at least 1.

The new diglycidyl ethers of the formula (IV) are manufactured by reacting compounds of the general formula

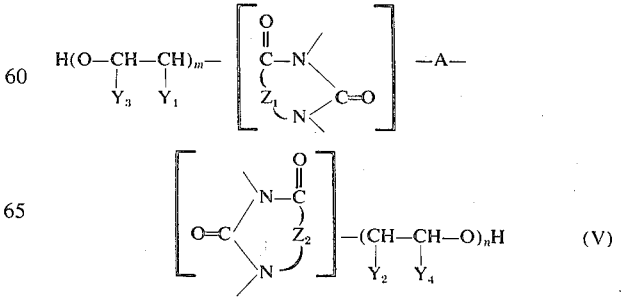

(V)

wherein $Y_1$, $Y_2$, $Y_3$, $Y_4$, $Z_1$, $Z_2$, A, m and n have the same meaning as in the formula (IV), in one stage or several stages, with an epihalogenohydrin or β-methylepihalogenohydrin, such as, for example, epichlorohydrin, β-methylepichlorohydrin or epibromohydrin, in a manner which is in itself known.

An aspect of this invention is as follows:

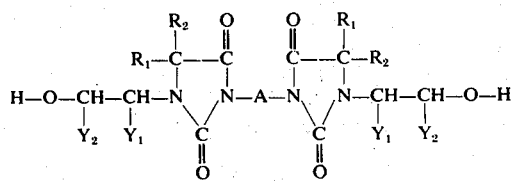

or

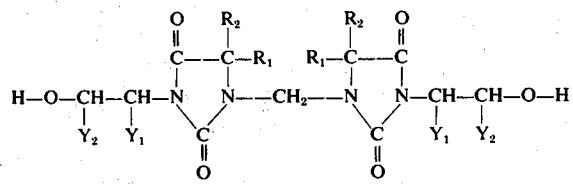

wherein $Y_1$ is hydrogen, $Y_2$ is ethyl, or wherein $Y_1$ and $Y_2$ together are trimethylene or tetramethylene; $R_1$ and $R_2$ is hydrogen or lower alkyl of 1 to 4 carbon atoms or $R_1$ and $R_2$ together are tetramethylene or pentamethylene; and A is alkylene of 1 to 12 carbon atoms or lower alkylene interrupted by one oxygen atom.

In the single-stage process, the reaction of the epihalogenohydrin with a compound of the formula (V) takes place in the presence of alkali, sodium hydroxide or potassium hydroxide being used preferably. In the preferentially used two-stage process, the compound of the formula (V) is condensed, in a first stage, with an epihalogenohydrin, in the presence of acid or basic catalysts, such as preferably tetraethylammonium chloride, to give the halogenohydrin compound, and thereafter the latter is dehydrohalogenated, in a second stage, by means of alkalis, such as potassium hydroxide or sodium hydroxide, to give the glycidyl ether.

The addition of the butene oxide, cyclopentene oxide or cyclohexene oxide to one or both NH groups of the N-heterocyclic compounds of the formula (III) can be carried out in the presence of either acid or alkaline catalysts, and per equivalent N group of N-heterocyclic compound of the formula (III) a slight excess over the equivalent epoxide groups of the butene oxide is employed.

Preferably, however, alkaline catalysts such as tetraethylammonium chloride or tertiary amines, are used in the manufacture of monoalcohols and dialcohols of the formula (V) in which the sum of m and n equals 1 or 2. However, alkali halides, such as lithium chloride or sodium chloride, can also be used successfully for this addition reaction; the reaction also takes place without catalysts.

In the preparation of dialcohols of the formula (V) in which the sum of m and n is greater than 2, it is preferred to start from the simple dialcohols of the formula (V) in which m and n are each 1, and to add further butene oxide to the two OH groups of this compound, in the presence of acid catalysts.

The binuclear N-heterocyclic compounds of the formula (III) used for the manufacture of the new butene oxide addition products of the formula (V) are above all bis-(hydantoin) compounds or bis-(dihydro-uracil) compounds, in which the two N-heterocyclic rings are linked to one another via an alkylene bridge, for example a methylene group, which is bonded to an endocyclic nitrogen atom of each of the heterocyclic rings in question.

A first category of such bis-(hydantoin) compounds corresponds to the general formula

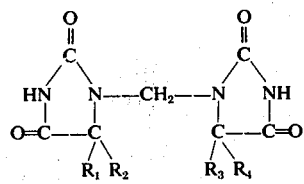 (VI)

wherein $R_1$, $R_2$, $R_3$ and $R_4$ each denote a hydrogen atom or a lower alkyl radical with 1 to 4 carbon atoms, or wherein $R_1$ and $R_2$, or $R_3$ and $R_4$, together form a tetramethylene or pentamethylene radical.

1,1'-methylene-bis-(5,5-dimethyl-hydantoin), 1,1'-methylene-bis-(5-methyl-5-ethyl-hydantoin), 1,1'-methylene-bis-(5-propyl-hydantoin) and 1,1'-methylene-bis-(5-isopropylhydantoin) may for example be mentioned.

A further class of such bis-(hydantoin) compounds corresponds to the general formula

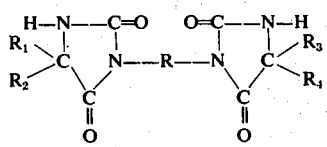 (VII)

wherein R is an aliphatic, cycloaliphatic or araliphatic radical, especially an alkyl radical or an alkylene radical interrupted by oxygen atoms, and R, $R_2$, $R_3$ and $R_4$ each denote a hydrogen atom or a lower alkyl radical with 1 to 4 carbon atoms, or wherein $R_1$ and $R_2$, or $R_3$ and $R_4$, together form a tetramethylene or pentamethylene radical. Bis-(5,5-dimethyl-hydantoinyl-3)-methane, 1,2-bis-(5',5'-dimethyl-hydantoinyl-3')-ethane, 1,4-bis-(5',5'-dimethyl-hydantoinyl-3')-butane, 1,6-bis-(5',5'-dimethyl-hydantoinyl-3')-hexane, 1,12-bis-(5',5'-dimethyl-hydantoinyl-3')-dodecane and β,β'-bis-(5',5'-dimethyl-hydantoinyl-3')-diethyl ether may be mentioned.

A preferentially used category of bis-(dihydrouracil) compounds corresponds to the general formula

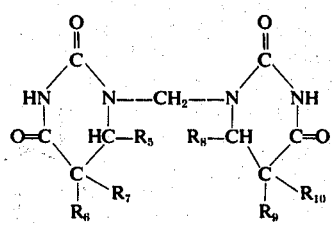 (VIII)

wherein $R_5$, $R_6$, $R_7$, $R_8$, $R_9$ and $R_{10}$ independently of one another each denote a hydrogen atom or a lower alkyl radical with 1 to 4 carbon atoms.

1,1'-Methylene-bis-(5,6-dihydrouracil), 1,1'-methylene-bis-(6-methyl-5,6-dihydrouracil) and 1,1'-methylene-bis-(5,5-dimethyl-5,6-dihydrouracil) may be mentioned.

The diglycidyl compounds according to the invention, of the formula (IV), react with the usual curing agents for polyepoxide compounds and can therefore be crosslinked, or cured, by addition of such curing agents, analogously to other polyfunctional epoxide compounds or epoxide resins. Possible curing agents of this nature are especially polycarboxylic acid anhydrides, such as, for example, hexahydrophthalic anhydride or phthalic anhydride, and also polyamines, such as for example triethylenetetramine or 3,5,5-trimethyl-3(aminomethyl)-cyclohexylamine.

The curable epoxide resin mixtures are above all employed in the fields of surface protection, the electrical industry, laminating processes and the building industry.

In the examples which follow, unless otherwise stated, parts denote parts by weight and percentages denote percentages by weight. The relationship of parts by volume to parts by weight is as of the millilitre to the gram.

To determine the mechanical and electrical properties of the curable mixtures described in the examples which follow, sheets of size 92 × 41 × 12 mm were manufactured for determining the flexural strength, deflection, impact strength and water absorption. The test specimens (60 × 10 × 4 mm) for determining the water absorption, and for the flexural test and impact test (VSM 77,103 and VSM 77,105 respectively) were machined from the sheets.

Test specimens of sizes 120 × 15 × 10 mm were in each case cast for determining the heat distortion point according to Martens (DIN 53,458).

Sheets of sizes 120 × 120 × 4 mm were cast for determining the arcing resistance.

MANUFACTURE OF THE STARTING SUBSTANCES

EXAMPLE A:

1,1'-Methylene-bis-[3-(2''-hydroxy-n-butyl)-5,5-dimethylhydantoin]

A suspension of 134.1 g of 1,1'-methylene-bis-(5,5-dimethylhydantoin) (0.5 mol) and 2.68 g of lithium chloride in 350 ml of dimethylformamide is stirred at 60°C. 83.0 g of 1,2-butene oxide (1.15 mols) are added dropwise over the course of 30 minutes; the mixture is then stirred for a further 4½ hours at 75°C, whereupon a clear solution is produced. when the latter has been cooled to room temperature, it is filtered, and the clear, colourless solution is concentrated at 70°C on a rotary evaporator, under 15 mm Hg. Thereafter, the residue is dried to constant weight at 90°C/CC/10.1 mm Hg. 206.1 g (100% of theory) of a colourless, clear, highly viscous resin are obtained; its IR spectrum no longer shows any N-H absorptions, but displays the OH frequencies. Elementary analysis shows the following:

| found | calculated |
|---|---|
| 13.6 % N | 13.58 % N |
| 7.9 % H | 7.82 % H |

Accordingly, the new diol has the following structure:

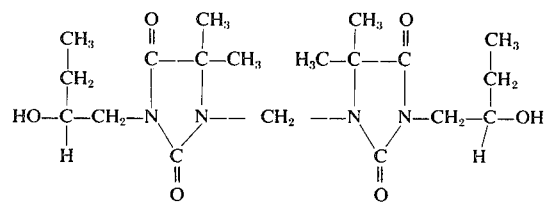

EXAMPLE B:

1,6-Bis-[1'-(2''-hydroxy-n-butyl)-5',5'-dimethylhydantoinyl-3']-hexane.

169.2 g of 1,6-bis-(5',5'-dimethylhydantoinyl-3')-hexane (0.5 mol) and 0.848 g of lithium chloride are dissolved in 300 ml of dimethylformamide and the solution is stirred at 65°C. 144.2 g of 1,2-butene oxide (2.0 mol) are added over the course of one hour. Thereafter, the reaction mixture is stirred for a further 20 hours at 75°C and cooled to room temperature, and the slight cloudiness originating from the hydantoin raw material is removed by filtration. The clear solution is completely concentrated on a rotary evaporator at 75°C, under a waterpump vacuum; thereafter, the residue is dried to constant weight at 0.2 mm Hg and 90°C. 206.5 g of a pale yellow, clear, transparent, highly viscous substance (85.8% of theory) are obtained, consisting mainly of the compound of the following structure:

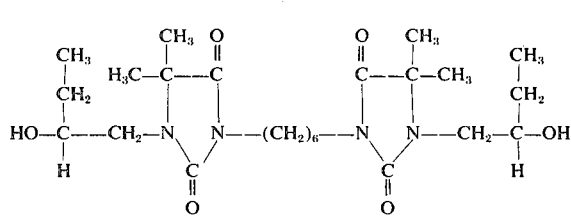

EXAMPLE C:

β,β-Bis-[1-(2'-hydroxy-n-butyl)-5,5-dimethylhydantoinyl-3]-diethyl ether.

A solution of 375 g of β,β'-bis-(5,5-dimethylhydantoinyl-3)-diethyl ether (1.15 mols) and 1.95 g of lithium chloride in 500 ml of dimethylformamide is prepared at 60°C. 332.0 g of 1,2-butene oxide (4.60 mols) are added dropwise to this solution over the course of 45 minutes, whilst stirring. The reaction mixture is stirred for a further 15 hours at 80°C and filtered, and the clear, colourless solution is concentrated at 70°C on a rotary evaporator, under a waterpump vacuum. The residue is then dried to constant weight under 0.1 mm Hg at 95°C bath temperature. A highly viscous, clear, transparent, pale yellowish-coloured substance is obtained in 100% yield (541.2 g). The infrared spectrum shows, through the absence of the amide N—H absorption and through the presence of a strong OH absorption, that the new substance has the following structure:

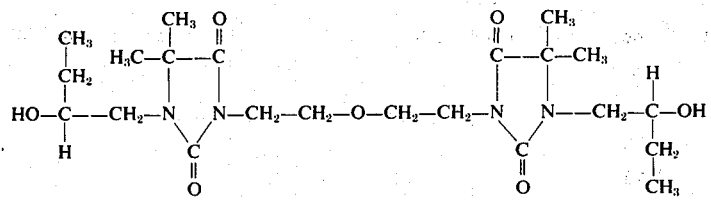 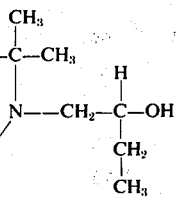

EXAMPLE D:

1,1'-Methylene-bis-[3-(2''-hydroxycyclohexyl)-5,5-dimethylhydantoin]

216.0 g of cyclohexene oxide (2.2 mols) are added dropwise over the course of 120 minutes to a clear solution of 268.1 g of 1,1'-methylene-bis-(5,5-dimethylhydantoin) (1.0 mol) and 2.0 g of lithium chloride in 550 ml of dimethylformamide, at 100° to 102°C. A slightly yellowish, clear solution results. After the dropwise addition, the solution is stirred for a further 300 minutes at 125°C. The solution is subsequently concentrated to dryness on a rotary evaporator at 80°C under a waterpump vacuum, and the residue is subsequently dried to constant weight at 110°C under 0.2 mm Hg. 461 g of a colourless crystal mass (98.4% of theory), melting at 216°–220°C, are obtained.

For purification, 458 g of the crude product are recrystallised from a mixture of 500 ml of dimethylformamide and 100 ml of water. 378 g of fine, colourless crystals (82.6% of the theoretical amount) are obtained. The purified product melts at 228°–229.8°C.

The proton-magnetic resonance spectrum (60 Mc H-NMR, recorded in $CDCl_3$ against tetramethylsilane as the internal standard) shows, through the presence of the following signals, that the formula given below is to be ascribed to the product obtained:

5.15    Singlet N—$CH_2$—N 2 protons
3.5 – 4.6    Multiplet N—CH—CH—OH 6 protons
1.3 – 2.5    Multiplet of remaining $CH_3$— and $CH_2$—protons (28)

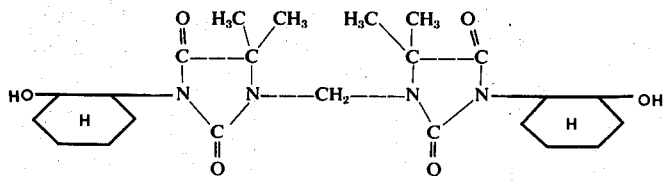

EXAMPLE E 1,1'-Methylenebis-(3-(2''-hydroxy-n-butyl)-5-isopropylhydantoin)

A suspension of 74.1 g of 1,1'-methylenebis-(5-isopropylhydantoin) (0.25 mol), 200 ml of dimethylformamide and 0.53 g of lithium chloride is stirred at 65°C. 49.6 g of 1,2-butene oxide (0.688 mol) are added dropwise thereto, over the course of 120 minutes. The temperature is then raised to 100°C over the course of 60 minutes and the mixture is allowed to react for a further 9 hours whilst stirring, a clear solution being produced thereby.

This is cooled to room temperature and filtered, and the filtrate is concentrated to dryness at 80°C/15 mm Hg. Thereafter, the residue is treated at 90°C/0.2 mm Hg until constant weight is reached. 110.5 g (corresponding to 100% of theory) of a colourless, clear, viscous substance are obtained, consisting mainly of 1,1'-methylenebis-(3-[2''-hydroxy-n-butyl]-5-isopropylhydantoin).

EXAMPLE F 1,1'-Methylene-bis-(3-[2''-hydroxy-n-butyl]-5,5-dimethyl-5,6-dihydrouracil)

A suspension of 148.2 g of 1,1'-methylenebis-(5,5-dimethyl-5,6-dihydrouracil) (0.5 mol) in 350 ml of dimethylformamide is stirred with 1.06 g of lithium chloride at 65°C. 99.2 g of 1,2-butene oxide (1.376 mols) are added dropwise over the course of 2 hours, whilst stirring. The temperature is then raised to 103°–105°C over the course of 150 minutes; a clear, colourless solution is thereby produced. This is stirred for a further 10 hours at this temperature and then cooled to room temperature and worked up in accordance with Example D. 220.0 g of the crude 1,1'-methylenebis-(3-[2''-hydroxy-n-butyl]-5,5-dimethyl-5,6-dihydrouracil) (100% of theory) are obtained as a clear, colourless, viscous liquid.

I. MANUFACTURING EXAMPLES

EXAMPLE 1

1,1'-Methylene-bis-[3-(2''-glycidyloxy-n-butyl)-5,5-dimethylhydantoin]

205.9 g of the 1,1'-methylene-bis-[3-(2''-hydroxy-n-butyl)-5,5-dimethylhydantoin] manufactured according to Example A (0.499 mol) together with 925 g of epichlorohydrin (10 mols) and 2.5 g of tetraethyleneammonium chloride are stirred for one hour at 90°C. A circulatory distillation is then started at 60°C/60–90 mm Hg, with vigorous stirring, and 103.0 g of 50% strength aqueous sodium hydroxide solution are slowly added dropwise over the course of 2 hours. At the same time, the water present in the reaction mixture is continuously azeotropically removed from the circuit and separated off. After the addition of the sodium hydroxide solution, the mixture is distilled for a further 15 minutes to remove the last remnants of water. The sodium chloride formed is filtered off and rinsed with 100 ml of epichlorohydrin, and the combined epichlorohydrin solutions are extracted by shaking with 200 ml of water, so as to remove traces of sodium hydroxide and sodium chloride. The organic phase is separated off and completely concentrated at 60°C on a rotary evaporator under a slight vacuum; the residue is then dried to constant weight at 80°C under 0.1 mm Hg.

220.4 g (81.2% of theory) of a light brown, viscous, liquid epoxide resin containing 3.2 epoxide equivalents per kg (84.3% of theory) are obtained, corresponding substantially to the following formula:

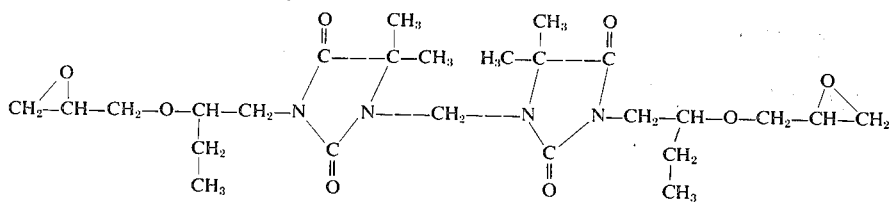

10

EXAMPLE 2

1,6-Bis-[1'-(2''-glycidyloxy-n-butyl)-5',5'-dimethylhydantoinyl-3']-hexane.

A mixture of 193.0 g (0.4 mol) of the 1,6-Bis-[1'-(2''-hydroxy-n-butyl)-5', 5'-dimethylhydantoinyl-3']-hexane manufactured according to Example B, 741.0 g of epichlorohydrin (8 mols) and 2.0 g of tetraethylammonium chloride is stirred for 90 minutes at 90°C. A circulatory distillation is then started at 60°C/55–85 mm Hg, with vigorous stirring, and 81.6 g of a 50% strength aqueous sodium hydroxide solution are added dropwise over the course of 120 minutes. At the same time, the water present in the reaction mixture is azeotropically removed from the circuit and separated off. Thereafter, the sodium chloride formed is filtered off and rinsed with 60 ml of epichlorohydrin, and the combined epichlorohydrin solutions are extracted by shaking with 150 ml of water, to remove traces of sodium hydroxide and sodium chloride. The organic phase is separated off and completely concentrated on a rotary evaporator at 60°C, under a slight vacuum. Thereafter, the residue is dried to constant weight at 80°C under 0.1 mm Hg.

210.5 g of a pale yellow, viscous resin (85% of theory) are obtained. The epoxide content is 2.68 equivalents/kg (corresponding to 79.6% of theory). The total chlorine content is 0.7%.

EXAMPLE 3

$\beta,\beta'$-Bis-[1-(2'-glycidyloxy-n-butyl)-5,5-dimethylhydantoinyl-3]-diethyl ether.

517.0 g of the $\beta,\beta'$-bis-[1-(2'-hydroxy-n-butyl)-5,5-dimethylhydantoinyl-3]-diethyl ether manufactured according to Example C (1.1 mols) are mixed with 2035 g of epichlorohydrin (22 mols) and 5.45 g of tetraethylammonium chloride. This mixture is stirred for 1 hour at 90°C. It is then dehydrohalogenated as described in Example 2, using 228.7 g of 50% strength aqueous sodium hydroxide solution and azeotropically removing water at 60°C. Working up is also effected in accordance with Example 2.

543.0 g (85% of theory) of a clear, viscous resin are obtained. The epoxide content is 2.65 equivalents/kg (77% of theory). The total chlorine content is 1.1%.

EXAMPLE 4

1,1'-Methylene-bis-[3-(2'-glycidyloxycyclohexyl)-5,5-dimethylhydantoin]

A mixture of 232 g of the 1,1'-methylene-bis-[3-(2'-hydroxycyclohexyl)-5,5-dimethylhydantoin] manufactured according to Example D (0.5 mol), 2.48 g of tetramethylammonium chloride and 1388 g of epichlorohydrin (15 mols) is heated to the boil at 116°–117°C for 60 minutes, with good stirring.

The mixture is then dehydrohalogenated over the course of 2 hours with 100 g of 50% strength aqueous sodium hydroxide solution, in accordance with Example 1. The working up and the isolation of the reaction product are also effected exactly as in Example 1.

193 g of a crystallising, yellowish melt (66.5% of theory) are obtained. The epoxide content is 2.75 epoxide equivalents per kg (corresponding to 80% of theory). The proton-magnetic resonance spectrum shows the epoxide signals at $\delta=2.55-3.00$ and $\delta=3.10-3.20$, and is in other respects, apart from the signals of OH groups, identical with the spectrum of the starting product.

EXAMPLE 5

88.1 g of the 1,1'-methylene-bis(3-[2''-hydroxy-n-butyl]-5-isopropylhydantoin) manufactured according to Example E (0.2 mol), 925 g of epichlorohydrin and 1.5 g of 50% strength aqueous tetraethylammonium chloride solution are subjected to an azeotropic circulatory distillation at 60°C reaction temperature and 60–85 mm Hg vacuum, whilst stirring; at the same time, the bath temperature is 142°–145°C. When the distillation is well under way, 40 g of 50% strength aqueous sodium hydroxide solution are added dropwise over the course of 120 minutes, and at the same time the water present in the reaction mixture is continuously separated off. After completion of the addition of sodium hydroxide solution, distillation is continued until the last traces of water have been separated off; 24 ml (85.5% of theory) are found. Working up is carried out analogously to Example 2, and a clear, liquid, practically colourless resin of 2.96 epoxide equivalents/kg is obtained.

EXAMPLE 6

88.1 g of 1,1'-methylenebis-(3-[2''-hydroxy-n-butyl]-5,5-dimethyl-5,6-dihydrouracil) (0.2 mol) are reacted with 925 g of epichlorohydrin, using 1.5 g of 50% strength aqueous tetraethylammonium chloride solution as an auxiliary, in accordance with Example 5, the dehydrohalogenation being carried out with 40 g of 50% strength aqueous sodium hydroxide solution, precisely in accordance with Example 5. Working up takes place as has been described in Example 2. 88 g (80% of theory) of a colourless, liquid, clear epoxide resin having 3.02 epoxide equivalents per kg are obtained.

II. EXAMPLES OF USES

Example I 112.5 g of the 1,1'-methylene-bis-[3-(2''-glycidyloxy-n-butyl)-5,5-dimethylhydantoin[ manufactured according to Example 1, having 3.2 epoxide equivalents/kg, are mixed with 47.3 g of hexahydrophthalic anhydride at 75°C. The homogeneous, clear melt is cured in aluminium moulds over the course of 3 hours at 80°C and 12 hours at 150°C.

Mouldings having the following mechanical properties are obtained:

| | | |
|---|---|---|
| Flexural strength (VSM 77,103) | 9.61 | kp/mm² |
| Deflection (VSM 77,103) | 3.7 | mm |
| Impact strength (VSM 77,105) | 12.25 | cmkp/cm² |
| Water absorption (4 days/20°C) | 0.58 | % |
| Tensile strength (VSM 77,101) | 4.89 | kp/mm² |

EXAMPLE II 74.6 g of the 1,6-bis-[1'-(2''-glycidyloxy-n-butyl)-5',5'-dimethylhydantoinyl-3']-hexane manufactured according to Example 2, having 2.68 epoxide equivalents/kg, are mixed with 26.4 g of hexahydrophthalic anhydride and 0.1 g of benzyldimethylamine at 70°C, and cured in 3 hours at 80°C and 12 hours at 150°C in an aluminium mould.

A pale yellow, clear, transparent moulding having the following properties is obtained:

| | | |
|---|---|---|
| Flexural strength (VSM 77,103) | 10.04 | kp/mm² |
| Impact strength (VSM 77,105) | 13.5 | cmkp/cm² |
| Water absorption (4 days/20°C) | 0.66 | % |

EXAMPLE III 302 g of the β,β'-bis-[1-(2'-glycidyloxy-n-butyl)-5,5-dimethylhydantoinyl-3]-diethyl ether manufactured according to Example 3, having 2.65 epoxide equivalents/kg, are worked into a homogeneous melt with 106 g of hexahydrophthalic anhydride at 70°C. Curing is carried out in aluminium moulds of 4 mm wall thickness, over the course of 3 hours at 80°C and 12 hours at 150°C.

Mouldings have the following properties are obtained:

| | | |
|---|---|---|
| Tracking resistance (VDE 0303) | | KA3b |
| Arcing resistance (DIN 53,484) | | L4 |
| Breakdown voltage, 23°C (instantaneous value) | | 221 kV/cm |
| Dielectric loss factor (50 c/s) tg δ | at 24°C | 0.008 |
| | at 40°C | 0.037 |
| Volume resistance $\rho_D'$ 24°C | | 2.4 × 10¹⁵ Ω cm |

We claim:
1. An alcohol of the formula:

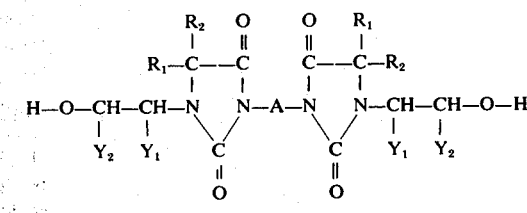

or

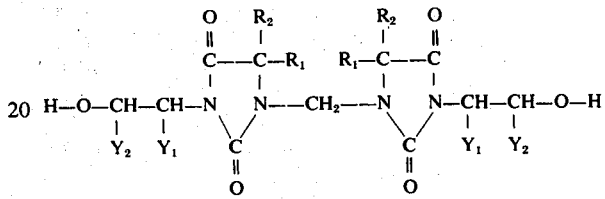

wherein $Y_1$ is hydrogen, $Y_2$ is ethyl, or wherein $Y_1$ and $Y_2$ together are trimethylene or tetramethylene; $R_1$ and $R_2$ is hydrogen or lower alkyl of 1 to 4 carbon atoms or $R_1$ and $R_2$ together are tetramehtylene or pentamethylene; and A is alkylene of 1 to 12 carbon atoms or lower alkylene interrupted by one oxygen atom.

2. The alcohol of claim 1 which is 1,1'-Methylene-bis-[3-(2''-hydroxy-n-butyl)-5,5-dimethylhydantoin].

3. The alcohol of claim 1 which is 1,6-Bis-[1'-(2''-hydroxy-n-butyl)-5',5'-dimethyl-hydantoinyl-3']-hexane.

4. The alcohol of claim 1 which is β,β'-Bis-[1-(2'-hydroxy-n-butyl)-5,5-dimethylhydantoinyl-3]-diethyl ether.

5. The alcohol of claim 1 which is 1,1'-methylene-bis-[3-(2''-hydroxy-n-buty)-5-isopropylhydantoin].

* * * * *